H. M. LONG.
COVER.
APPLICATION FILED MAR. 7, 1910.

967,211.

Patented Aug. 16, 1910.
2 SHEETS—SHEET 1.

Witnesses
Luella Greenfield
Gertrude Tallman

Inventor
Howard M. Long
By Chappell Earl
Attorneys

H. M. LONG.
COVER.
APPLICATION FILED MAR. 7, 1910.
967,211.
Patented Aug. 16, 1910.
2 SHEETS—SHEET 2.
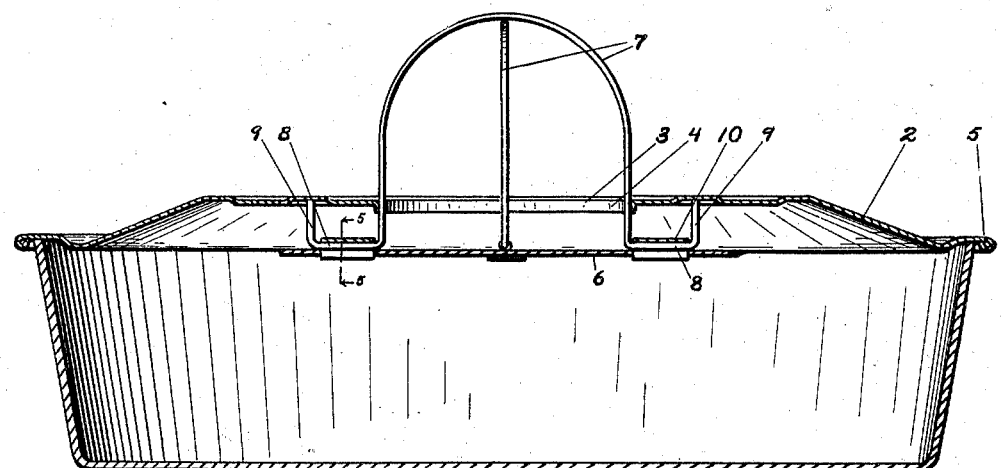
Fig. 2.
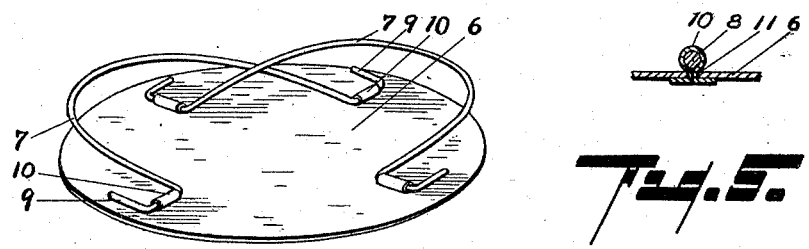
Fig. 4.
Fig. 5.
Witnesses
Luella Greenfield
Gertrude Tallman
Inventor
Howard M. Long
By Chappell Earl
Attorneys

UNITED STATES PATENT OFFICE.

HOWARD M. LONG, OF ALBION, MICHIGAN.

COVER.

967,211.

Specification of Letters Patent. Patented Aug. 16, 1910.

Application filed March 7, 1910. Serial No. 547,922.

*To all whom it may concern:*

Be it known that I, HOWARD M. LONG, a citizen of the United States, residing at Albion, Michigan, have invented certain new and useful Improvements in Covers, of which the following is a specification.

This invention relates to improvements in covers.

My improved cover or lid is especially designed by me for use as a cover or lid for frying pans, kettles and the like.

The main objects of this invention are to provide an improved cover or lid for frying pans, kettles or the like, which is provided with a guarded ventilating opening, and also a structure which can be readily disassembled for cleaning, and reassembled, as desired.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

Figure 1:
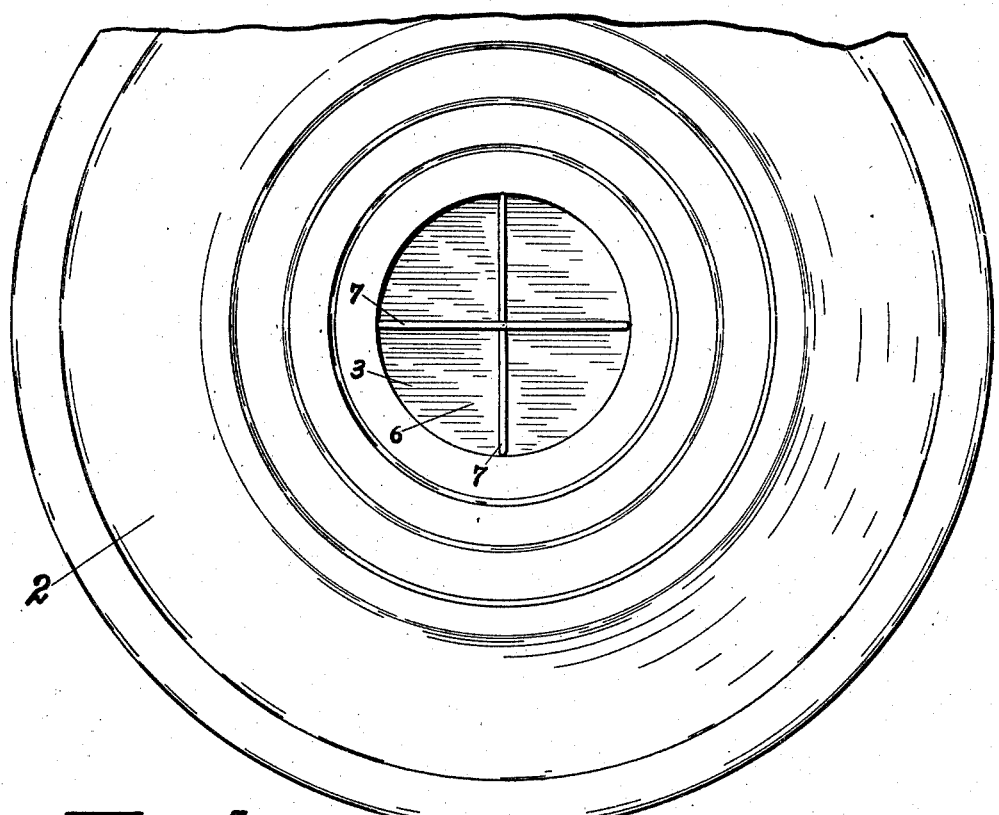
Figure 2:
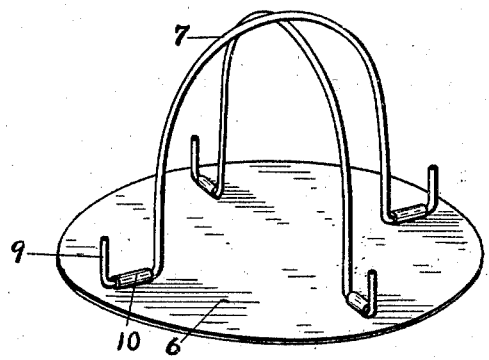

A structure constituting an effective and preferred embodiment of the features of my invention is clearly illustrated in the accompanying drawing, forming a part of this specification, in which:

Figure 1 is a detail plan view of my improved cover. Fig. 2 is a vertical central section through a frying pan with my improved cover in position thereon. Fig. 3 is a perspective view of the deflector plate with its supports in their erected position. Fig. 4 is a perspective view of the deflector plate with its supports collapsed. Fig. 5 is an enlarged detail section taken on a line corresponding to line 5—5 of Fig. 2, showing the means for securing the supports to the deflector plates.

In the drawings, similar reference numerals refer to similar parts throughout the several views.

Referring to the drawing, 1 represents a frying pan or cooking utensil of well-known type.

My improved cover 2 is provided with a central opening 3, the edge of the opening being preferably provided with a downwardly turned flange 4.

My cover is preferably convex in general form, and provided with a bead 5 at its edge adapted to fit over the edge of the frying pan or kettle.

I provide a deflector plate 6 for the opening, the plate being preferably a disk of tin to which is pivotally secured the bail-like supports 7. These supports are transversely disposed, so that when erected, they swing across each other. The pivots 8 for the supports, and the spacing members 9 are preferably formed integrally with the supports, all being formed of pieces of wire suitably conformed. These spacing members 9, when the supports are erected, are held in position to engage the under side of the cover, as clearly appears in Fig. 2. When the supports are erected, they may be inserted through the opening 3, and engage the edges thereof with sufficient friction to removably support the deflector plate. The diameter of the deflector plate is considerably greater than the cover opening, so that the opening is effectively guarded thereby. The pivots 8 are preferably embraced by straps 10, which are folded over the pivots and arranged through slots 11 in the deflector plate, the ends of the straps being turned outwardly, thereby securing them in place, see Fig. 5. This forms a simple and effective means for securing the parts in position. When the supports are inserted through the opening, they are held in their erected positions, so that they serve as a handle for the cover, as well as supports for the deflector plate.

It is obvious that the parts can be readily disassembled for cleaning, and reassembled as desired. Also, it is desirable to disassemble the parts for the purposes of shipping and storage.

I have illustrated my improved cover in detail in the form in which I have embodied the same, as I find this form to be satisfactory in practice. I am, however, aware that my improvements can be considerably varied in structural details without departing from my invention, and I desire to be understood as claiming the same specifically in the form illustrated, as well as broadly within the scope of the appended claims.

Having thus described my invention, what

I claim as new and desire to secure by Letters Patent is:

1. The combination of a cover having a central opening therein, a deflector plate for said opening, a pair of transversely disposed bail-like supports pivotally mounted on said cover to be erected or collapsed thereon and adapted, when erected, to be inserted through said opening in said cover and to engage the edges thereof for removably supporting said plate below said opening, said supports and their pivots being formed integrally of wire; and spacing members formed integrally with said supports and their pivots, whereby they are collapsed or erected with said supports, said supports being adapted, when the parts are assembled, to serve as a handle for said cover.

2. The combination of a cover having a central opening therein, a deflector plate for said opening, a pair of transversely disposed bail-like supports pivotally mounted on said cover to be erected or collapsed thereon and adapted, when erected, to be inserted through said opening in said cover and to engage the edges thereof for removably supporting said plate below said opening, said supports being adapted, when the parts are assembled, to serve as a handle for said cover.

3. The combination of a cover having a central opening therein, a deflector plate for said opening, a pair of transversely disposed bail-like supports mounted and adapted to be inserted through said opening in said cover and to engage the edges thereof for removably supporting said plate below said opening, and spacing members, said supports being adapted, when the parts are assembled, to serve as a handle for said cover.

4. The combination of a cover having a central opening therein, a deflector plate for said opening, a pair of transversely disposed bail-like supports mounted and adapted to be inserted through said opening in said cover and to engage the edges thereof for removably supporting said plate below said opening.

In witness whereof, I have hereunto set my hand and seal in the presence of two witnesses.

HOWARD M. LONG. [L. S.]

Witnesses:
CLYDE A. BACON,
O. HARRY GALE.